United States Patent
Park et al.

(10) Patent No.: US 8,532,680 B2
(45) Date of Patent: Sep. 10, 2013

(54) APPARATUS AND METHOD FOR COMPRESSING AND RESTORING SMS MESSAGE

(75) Inventors: Jae-Kyu Park, Jeonju-si (KR); Jong-Kwang Kim, Gunsan-si (KR); Jae-Hwan Ko, Gunsan-si (KR); Dae-Won Seo, Jeonju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 915 days.

(21) Appl. No.: 12/187,788

(22) Filed: Aug. 7, 2008

(65) Prior Publication Data
US 2009/0042589 A1    Feb. 12, 2009

(30) Foreign Application Priority Data
Aug. 9, 2007    (KR) .................. 10-2007-0080173

(51) Int. Cl.
*H04W 4/00*    (2009.01)
(52) U.S. Cl.
USPC ........................ 455/466; 455/412.1
(58) Field of Classification Search
USPC ............. 455/466, 412.1; 710/68; 704/10; 379/88.1
See application file for complete search history.

(56) References Cited

U.S. PATENT DOCUMENTS

| | | | | |
|---|---|---|---|---|
| 6,600,481 B1* | 7/2003 | Brown et al. | ............... | 345/169 |
| 2004/0171392 A1* | 9/2004 | Kwon et al. | ............... | 455/466 |
| 2006/0270425 A1* | 11/2006 | Lee | ............... | 455/466 |

FOREIGN PATENT DOCUMENTS

| | | |
|---|---|---|
| KR | 10-2005-0078426 A | 8/2005 |
| KR | 10-2007-0034759 A | 3/2007 |
| KR | 10-2007-0056392 A | 6/2007 |

* cited by examiner

*Primary Examiner* — Marcos Torres
(74) *Attorney, Agent, or Firm* — Sughrue Mion, PLLC (57) ABSTRACT

An apparatus and method for compressing and restoring a Short Message Service (SMS) are provided. The apparatus includes an input unit through characters are input by a user; a display unit displays the characters input by a user; a control unit which compares the characters input by the user with a stored sentence table of recommended sentences to determine whether there is at least one recommended sentence in the sentence table that corresponds to the input characters, and if it is determined that there is the at least one recommended sentence that corresponds to the input characters, controls the display unit to display the at least one recommended sentence; a converting unit which converts a recommended sentence selected by the user from among the at least one recommended sentence into a compression code; and a transmission unit which transmits an SMS message that includes the recommended sentence converted into the compression code.

18 Claims, 6 Drawing Sheets

APPARATUS AND METHOD FOR COMPRESSING AND RESTORING SMS MESSAGE

CROSS REFERENCE TO RELATED APPLICATION

This application claims priority from Korean Patent Application No. 10-2007-0080173, filed on Aug. 9, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to compressing and restoring a Short Message Service (SMS) message, and more particularly, to compressing an SMS message right after a user creates the SMS message, and efficiently providing the SMS message that is restricted in capacity.

2. Description of the Related Art

With the rapid development of a communication technology, communication terminals, such as mobile phones, personal data assistants (PDAs), pocket personal computers (PCs), or Internet terminals, have been developed, which enable individual persons to perform voice and data communication while moving.

In particular, due to a developing technology for general personal wireless communication service and a substantial increase in the number of wireless communication service subscribers, various additional services are being developed and actively provided. Among the additional services, since SMS has a function of enabling a user to send an SMS message using a sound communication terminal, SMS has attracted attention.

However, since there is a limitation in an amount of data which a user can send in an SMS message through the SMS, it is not possible to transmit a large number of characters at one time. In particular, an SMS message payload is limited 140 bytes, e.g., 160 7-bit characters in the case of Latin characters of GSM alphabet, and 70 16-bit characters in the case of non-Latin characters encoded using 2-byte Unicode encoding.

Korean Laid-open Publication No. 2005-0110092 (METHOD AND APPARATUS FOR TRANSMITTING SMS WITH ABSTRACT FOR MOBILE PHONE) discloses a technology that includes a preparation process in which when a user transmits an SMS message to another user using a mobile phone, if the user creates and inputs the SMS message and a compression key is input, a character having the same meaning is prepared through a search operation in a table of predetermined characters; a compression process in which when there is the same character as the character prepared during the preparation process, the corresponding character is converted into a table character and is compressed, and when the compression key is input, a space between the characters is removed; and a transmission process in which when a size of the SMS message compressed during the compression process is within an allowable capacity range, the SMS message is sent to a designated user. However, Korea Laid-open Publication No. 2005-0110092 does not disclose a technology for sending a compressed SMS message without separately performing a compression process.

SUMMARY OF THE INVENTION

The present invention provides an apparatus and method for compressing and restoring an SMS message that is capable of compressing an SMS message right after a user creates the SMS message, thereby efficiently providing the SMS message that is reduced in size.

The present invention also provides an apparatus and method for compressing and restoring an SMS message that is capable of providing recommended sentences to a user, thereby enabling compression to be automatically performed when the recommended sentences are used by the user.

According to an aspect of the present invention, there is provided an apparatus for compressing an SMS message, the apparatus including an input unit through which characters are input by a user; a display unit which displays the characters input by the user; a control unit which compares the characters input by the user with a stored sentence table of recommended sentences to determine whether there is at least one recommended sentence among the recommended sentences of the sentence table that corresponds to the input characters, and if it is determined that there is the at least one recommended sentence that corresponds to the input characters, controls the display unit to display the at least one recommended sentences; a converting unit which converts a recommended sentence selected by the user from among the at least one recommended sentence displayed by the displayed unit into a compression code; and a transmission unit which transmits an SMS message that includes the recommended sentence converted into the compression code.

According to another aspect of the present invention, there is provided a method of compressing an SMS message, the method including comparing characters input by a user with a stored sentence table of recommended sentences and determining whether there is at least one recommended sentence among the recommended sentences of the sentence table that corresponds to the input characters based on a result of the comparing; if it is determined that there is the at least one recommended sentence that corresponds to the input characters, displaying the at least one recommended sentence; displaying a recommended sentence selected from among the at least one recommended sentence that is displayed; converting the displayed recommended sentence that is selected into a compression code; and transmitting an SMS message that includes the recommended sentence converted into the compression code.

According to another aspect of the present invention, there is provided an apparatus for restoring an SMS message, the apparatus including: a reception unit which receives an SMS message; a control unit determines whether each character of the SMS message is a compression code based on a data size of the character; a converting unit which, if the control unit determines that the character is the compression code, restores the compression code as a recommended sentence based on a stored sentence table of recommended sentences; and a display unit which displays the recommended sentence.

According to another aspect of the present invention, there is provided a method of restoring an SMS message, the method including: determining whether each character of an SMS message is a compression code based on a data size of the character; if it is determined that the character is the compression code, restoring the compression code as a recommended sentence based on a stored sentence table of recommended sentences; and displaying the recommended sentence.

However, aspects of the present invention are not restricted to the one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects of the invention will become more apparent by describing in detail exemplary embodiments thereof with reference to the attached drawings in which.

DESCRIPTION OF EXEMPLARY EMBODIMENTS

The exemplary embodiments of the invention will now be described with reference to the accompanying drawings.

Figure 1:
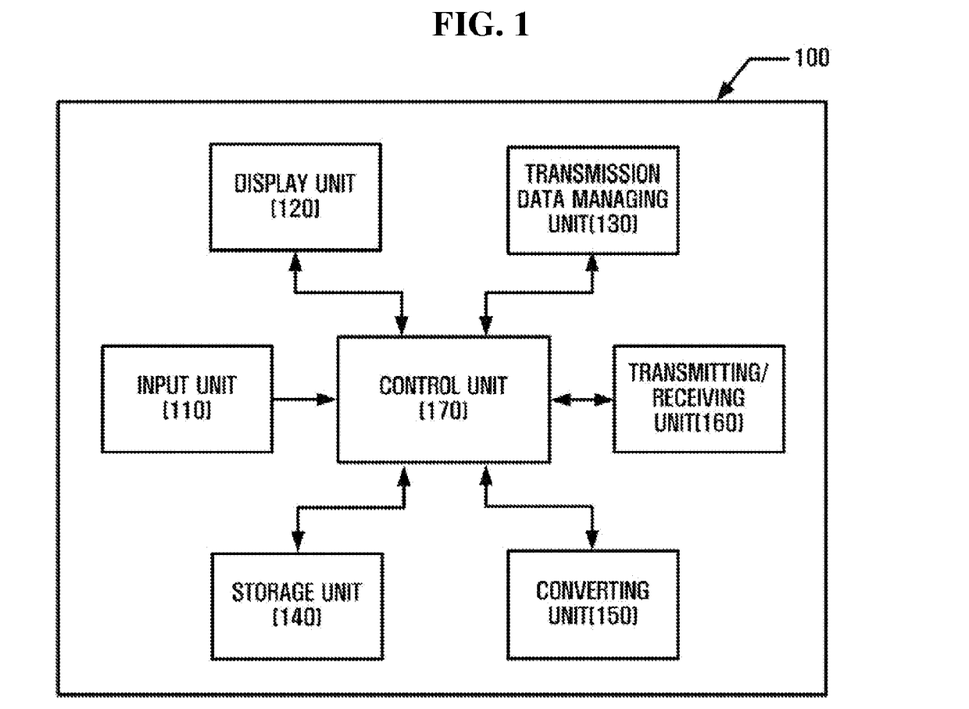
FIG. 1 is an internal block diagram illustrating an apparatus for compressing and restoring an SMS message according to an exemplary embodiment of the invention.

FIG. 1 is an internal block diagram illustrating an apparatus for compressing and restoring an SMS message according to an exemplary embodiment of the invention.

As shown in FIG. 1, an apparatus for compressing and restoring an SMS message 100 (hereinafter, simply referred to as apparatus 100) includes an input unit 110, a display unit 120, a transmission data managing unit 130, a storage unit 140, a converting unit 150, a transmitting/receiving unit 160, and a control unit 170. In this case, the apparatus 100 may be, for example, a mobile phone, a PDA, a Personal Communications Service (PCS) terminal, a wireless communication terminal, or an International Mobile Communications 2000 (IMT-2000) terminal.

The input unit 110 includes keys or buttons operable by a user to input characters forming a word or sentence (or character) and a predetermined functional button.

The display unit 120 displays the word(s) or sentence (or character) that is input through the input unit 110, and when there are recommended sentences (or recommended characters) based on the word or sentence (or character) input by the user, the display unit 120 is provided with and displays the corresponding recommended sentences. In this case, the word or sentence (or character) that is input by the user and displayed by the display unit 120 is referred to as input data. Further, one or more recommended sentences are displayed by the display unit 120 in a recommended sentence window. As a result, the user can select a desired recommended sentence from among the displayed recommended sentences. Accordingly, the user can easily input the desired sentence or character using the recommended sentences, and compression of an SMS message is possible. Hereinafter, an example of input data that is displayed by the display unit 120 is described in detail with reference to FIG. 3A.

The transmission data managing unit 130 stores and manages words and sentences (or characters) input by the user and recommended sentences or recommended characters) selected by the user. In this case, the recommended sentence that is selected by the user is input with a sentence compression code of two bytes. In this case, a word or sentence (or character) that is input to the transmission data managing unit 130 is referred to as transmission data. Hereinafter, an example of transmission data that is provided through the transmission data managing unit 130 is described in detail with reference to FIG. 3B.

The storage unit 140 stores a sentence table. In this case, the sentence table is configured such that extra sequence codes and recommended sentences, which are aligned in the order of a, b, c, . . . (that is, in ascending power), are matched with each other on a one-to-one basis. The extra sequence codes are the remaining codes (for example, codes of the Chinese language, the Arabic language, and the like) of 65536 codes, each of which can be created in two bytes, except for codes of the Korean language, the English language, special characters, and the like. That is, the sentence table is created using the extra codes, and has a structure in which the codes, each of which has a capacity of two bytes, and the recommended sentences, which are aligned in the order of a, b, c, . . . and each of which has a capacity of two bytes or more, are matched with each other on a one-to-one basis. The recommended sentences (or recommended characters) are sentences (or characters) that are generally used.

The converting unit 150 converts the recommended sentences, which are selected by the user on the basis of the sentence table stored in the storage unit 140, into compression codes, or restores the sentences (characters), which have been converted into the compression codes, as the recommended sentences.

The transmitting/receiving unit 160 transmits the transmission data, which is managed by the transmission data managing unit 130, to another apparatus, or receives transmission data that is transmitted by another apparatus.

The control unit 170 compares the words or sentences (or characters) input by the user via the input unit 110 with the sentence table previously stored in the storage unit 140, and determines whether there are recommended sentences (or recommended characters). When it is determined that there are one or more recommended sentences (or recommended characters), the control unit 170 controls the display unit 120 to display the one or more recommended sentences in the recommended sentence window, thereby enabling the user to select the recommended sentence (or recommended character).

Further, the control unit 170 determines whether the words or sentence (or character) input by the user is a general sentence (or general character) or a recommended sentence (or recommended character).

That is, when the sentence (character) input by the user is the general sentence (general character), the same character code is input to the input data and the transmission data. In this case, the general sentence (or general character) is a non-compressed sentence (or character), in which the user directly inputs using the apparatus 100. The general sentence (or general character) occupies a capacity of one byte or two bytes. When the sentence (or character) input by the user is the recommended sentence (or recommended character), a recommended sentence code of two or more bytes is input for the input data, and a corresponding sentence compression code of two bytes is input for the transmission data. In this case, the recommended sentences (or recommended characters) are sentences (or characters) that are frequently used and previously stored in the storage unit 140.

For example, when the user deletes a character (or sentence) using a predetermined functional button (for example, erasing button) to correct the character (or sentence) input by the user, the transmission data that is input through the transmission data managing unit 130 is deleted in a code unit. If the character (sentence), in which the user desires to delete, corresponds to a recommended sentence (or recommended character), a compression code corresponding to the recommended sentence is deleted in the transmission data. Further, the input data, which has been input through the display unit 120, is also corrected on the basis of the changed transmission data.

The control unit 170 checks whether the transmission data is a character of one byte or a character of two bytes to determine whether the corresponding transmission data is an English language character or a Korean language character.

Further, the control unit 170 controls the operation of the units 110 to 160 that constitute the apparatus 100.

The term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Figure 2:
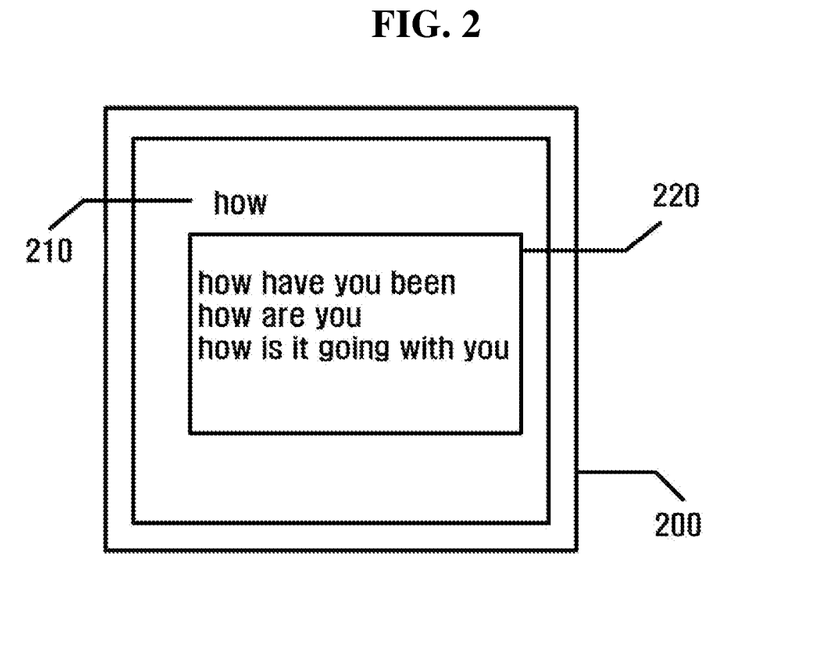
FIG. 2 is a diagram illustrating an example of providing recommended sentences in an apparatus for compressing and restoring an SMS message according to an exemplary embodiment of the invention.

FIG. 2 is a diagram illustrating an example of providing recommended sentences in an apparatus for compressing and restoring an SMS message according to an exemplary embodiment of the invention.

As shown in FIG. 2, input characters are provided to and displayed on a display panel 200 of the display unit 120.

Input data 210 ("how"), which is input by the user, is displayed on the display panel 200. Then, a recommended sentence window 220, which provides the recommended sentences on the basis of the characters input by the user, is displayed on the display panel 200.

Then, when there is a recommended sentence that is the same as a sentence, in which the user desires to input, among the sentences (for example, "how have you been"/"how are you"/"how is it going with you") provided in the recommended sentence window 200, the user selects the desired recommended sentence (or recommended character) among the recommended sentences (or recommended characters) provided in the recommended sentence window 220, by using a predetermined functional button(s) (for example, up and down buttons). For example, when the user selects the recommended sentence (for example, "how have you been"), the sentence "how have you been" is displayed on the display panel 200, and the recommended sentence window 220 disappears.

Meanwhile, when the desired sentence does not exist among the recommended sentences provided in the recommended sentence window 220, the user may press the predetermined functional button (for example, cancellation button), such that the displayed recommended sentence window 220 disappears.

Further, even in a state where the recommended sentence window 220 is shown, the user can continuously perform the general input operation. Therefore, the operation of making the recommended sentence window 220 disappear is not necessarily performed. Here, the recommended sentence window 220 does not affect the general input operation, and operates separately from the display panel 200.

That is, even in a state where the recommended sentence window 220 is shown on the display panel 200, the current sentence is continuously updated with the general input sentences. Further, the recommended sentences are newly searched, and updated recommended sentences are provided. Therefore, when the user desires to use the recommended sentences during the sentence input operation, the user may use the recommended sentences provided in the recommended sentence window 220 by selecting the recommended sentences using a directional key or the like. When the user does not desire to use the recommended sentences, the user may input a desired sentence through the general input operation.

Figure 3A:
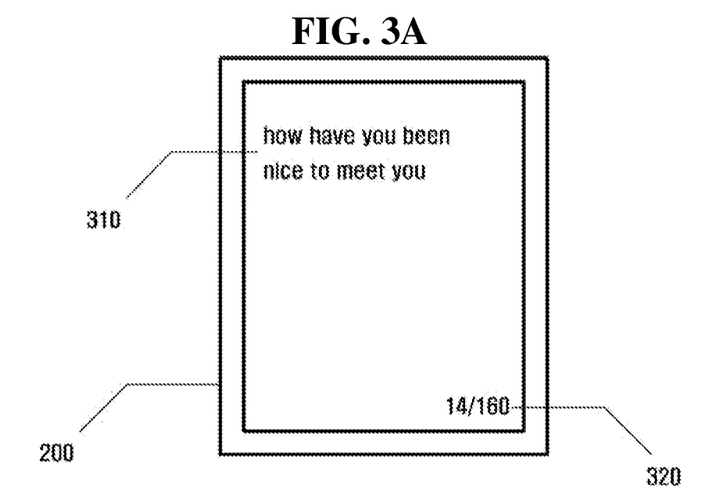
FIGS. 3A and 3B are diagrams illustrating examples of providing input data and transmission data in an apparatus for compressing and restoring an SMS message according to an exemplary embodiment of the invention.
Figure 3B:
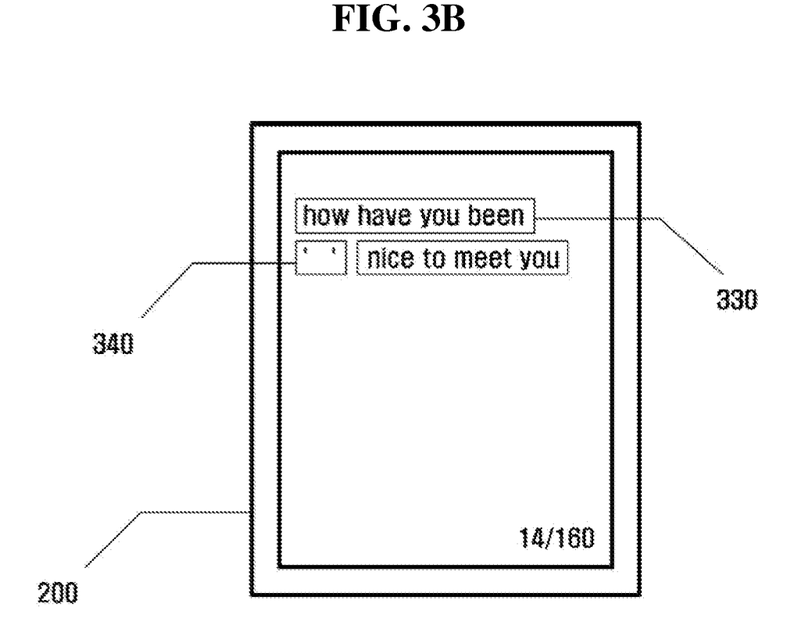

FIGS. 3A and 3B are diagrams illustrating examples of providing input data and transmission data in an apparatus for compressing and restoring an SMS message according to an exemplary embodiment of the invention.

As shown in FIG. 3A, if the user inputs characters forming a word or sentence, the input characters (that is, input data) 310 are displayed on the display panel 200 of the display unit 120.

Further, a used capacity 320 of an input sentence is displayed at a predetermined location of the display panel 200, and the user can determine whether new words or sentences can be additionally input on the basis of the used capacity 320 of the displayed sentence.

Further, among the sentences (that is, input data) that are input by the user, the used capacity of the general sentence is different from the used capacity of the recommended sentence. In this case, the used capacity of the general sentence is determined according to the number of input characters, and each of the recommended sentences occupies a capacity of two bytes regardless of the number of the corresponding characters.

For example, when the user inputs the sentence "how have you been" as the general sentence, each character has a data size of 1 byte, and thus, the corresponding sentence occupies a capacity of 14 bytes. However, when the user selects "how have you been" as the recommended sentence, the corresponding sentence occupies a capacity of two bytes regardless of the number of characters.

As shown in FIG. 3B, the characters (that is, input data) that are input by the user are input as the transmission data 330 through the transmission data managing unit 130. In this case, the transmission data is not provided for the user.

That is, the control unit 170 divides the sentences into the general sentences and the recommended sentences in the transmission data 300 that has been input through the transmission data managing unit 130, and checks special characters and spacing words, thereby calculating a total data size of transmitted data.

For example, characters, which are collected by a box 340, are determined as one sentence, and if the sentence (or characters) collected by the box 340 is the recommended sentence (or recommended characters), it is determined that the corresponding sentence occupies a capacity of two bytes. Further, if the words or sentence (or characters) collected by the box 340 is a general sentence (or general characters), a total used capacity of the corresponding sentence is determined on the basis of the number of characters. Further, it is determined that the spacing words occupy a capacity of 1 byte. In this case, the calculated size of the transmitted data is provided to the used capacity 320 that is displayed on the display panel 200 of FIG. 3A.

That is, among the input sentences (or characters), "how have you been", and "nice to meet you" are the recommended sentences (or recommended characters) that are stored in the storage unit 140, and thus, a used capacity of each sentence is calculated as two bytes. Further, the used capacity of " ' ' ", which are the input spacing words, is calculated as one byte.

Accordingly, when the user selects the recommended sentences (or recommended characters) that are provided through the recommended sentence window 220, the used recommended sentences occupy a small amount of capacity, as compared with the number of input sentences (or characters). Thus, a large amount of sentences (or characters) can be input, and the user does not need to individually input the corresponding sentences (or characters).

Figure 4:
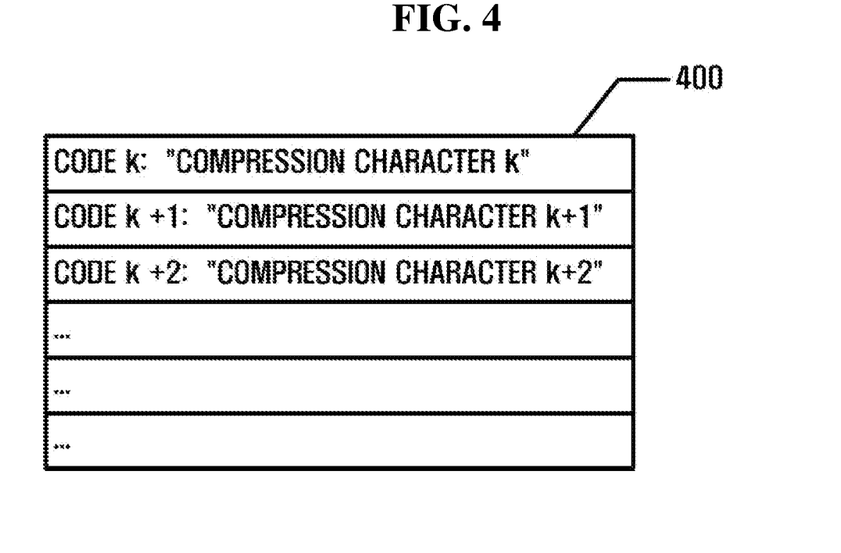
FIG. 4 is a diagram illustrating an example of providing a sentence table in an apparatus for compressing and restoring an SMS message according to an exemplary embodiment of the invention.

FIG. 4 is a diagram illustrating an example of providing a sentence table in an apparatus for compressing and restoring an SMS message according to an exemplary embodiment of the invention.

As shown in FIG. 4, the sentence table 400 is configured such that extra sequence codes and recommended sentences (recommended characters), which are aligned in the order of a, b, c, . . . (that is, in ascending power), are matched with each other on a one-to-one basis. In this case, the extra sequence codes are the remaining codes (for example, codes of the Chinese language, the Arabic language code, and the like), except for codes of the Korean language, the English language, special characters, and the like.

For example, the sentence table is created using the extra codes, and has a structure where the codes, each of which has a capacity of two bytes, and the recommended sentences (recommended characters), each of which has a capacity of two or more bytes and which are aligned in the order of a, b, c, . . . , are matched with each other on a one-to-one basis.

Further, the process of searching the recommended sentences (or recommended characters) that are stored in the sentence table 400 is the same as the process of searching a sentence whose front portion is the same as a keyword, in the sentences of the sentence table 400. In this case, since the sentences are aligned in the order of a, b, c, . . . , binary search can be performed using the keyword. The binary search is suitable for search in arrangement where the sentences are aligned. According to the binary searching method, a value at the center of the arrangement is searched, it is checked whether an item, which the user desires to search, is located at a left side or a right side, and a search range is reduced to half the original search range. Then, the search is performed.

For example, if a sentence is input, a forward matching sentence is first searched through binary search, a forward matching range in the upper and lower portions is determined on the basis of the searched sentence, and the corresponding sentences are used as the recommended sentences.

Figure 5:
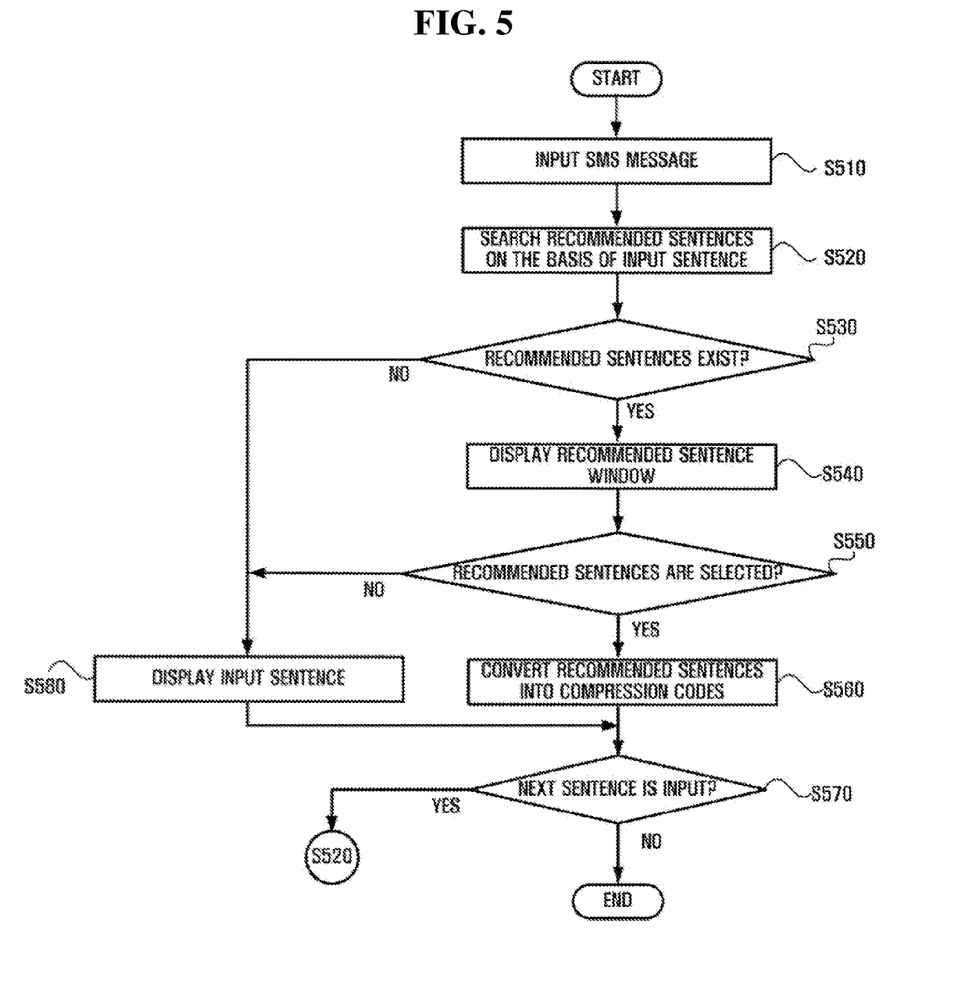
FIG. 5 is a flowchart illustrating a process of compressing an SMS message in a method of compressing and restoring an SMS message according to an exemplary embodiment of the invention.

FIG. 5 is a flowchart illustrating a process of compressing an SMS message in a method of compressing and restoring an SMS message according to an exemplary embodiment of the invention.

When the user inputs an SMS message using the input unit 110 (operation S510), the input SMS message (that is, input data) is displayed on the display panel 200 of the display unit 120.

Then, the control unit 170 compares the input word(s) or sentence (or character) and the sentence table stored in the storage unit 140 and determines whether there is at least one recommended sentence (or recommended character) that corresponds to the input word(s) or sentence (or character) (operation S530).

If it is determined that at least one recommended sentence (or recommended character) exists (Yes of operation S530), the control unit 170 controls the display unit 120 to display the recommended sentence window 220 (operation S540), thereby enabling the user to select the recommended sentence (or recommended character). In this case, the recommended sentence window 220 is displayed, the user can select a desired recommended sentences among recommended sentences (or recommended characters), which are provided in the recommended sentence window 220, by using the predetermined functional buttons (for example, up and down buttons). If the recommended sentences (or recommended characters) are selected, the user may press a confirmation button, thereby enabling the corresponding recommended sentences to be input to the display panel 200.

Then, when the user selects the recommended sentence (or recommended character) that is provided in the recommended sentence window 220 (YES of operation S550), the display unit 120 displays the selected recommended sentence (or recommended character). The converting unit 150 converts the input recommended sentence (or recommended character) into a sentence compression code, and the transmission data managing unit 130 inputs the converted sentence compression code of two bytes (operation S560).

The control unit 170 then determines whether a next sentence (or character) is input by the user (operation S570). If it is determined that the next sentence is input, the process of operation S520 is performed again.

If it is determined in operation S530 that a recommended sentence (or recommended character) does not exist (NO of operation S530), the control unit 170 controls the display unit 120 to display the word(s) or sentence (character) input by the user (operation S580).

Further, in operation S550, when the user does not select the recommended sentence (or recommended character) from the recommended sentences that are provided in the displayed recommended sentence window 220 (NO of operation S550), the control unit 170 allows the display unit 120 to display the sentence (or character) input by the user (operation S580). In this case, when the desired recommended sentence (or recommended character) does not exist in the recommended sentence window 220, the user presses the predetermined functional button (for example, cancellation button) such that the displayed recommended sentence window 220 disappears. In the state where the recommended sentence window 220 is provided, the user may continuously input the sentence (or character).

Figure 6:
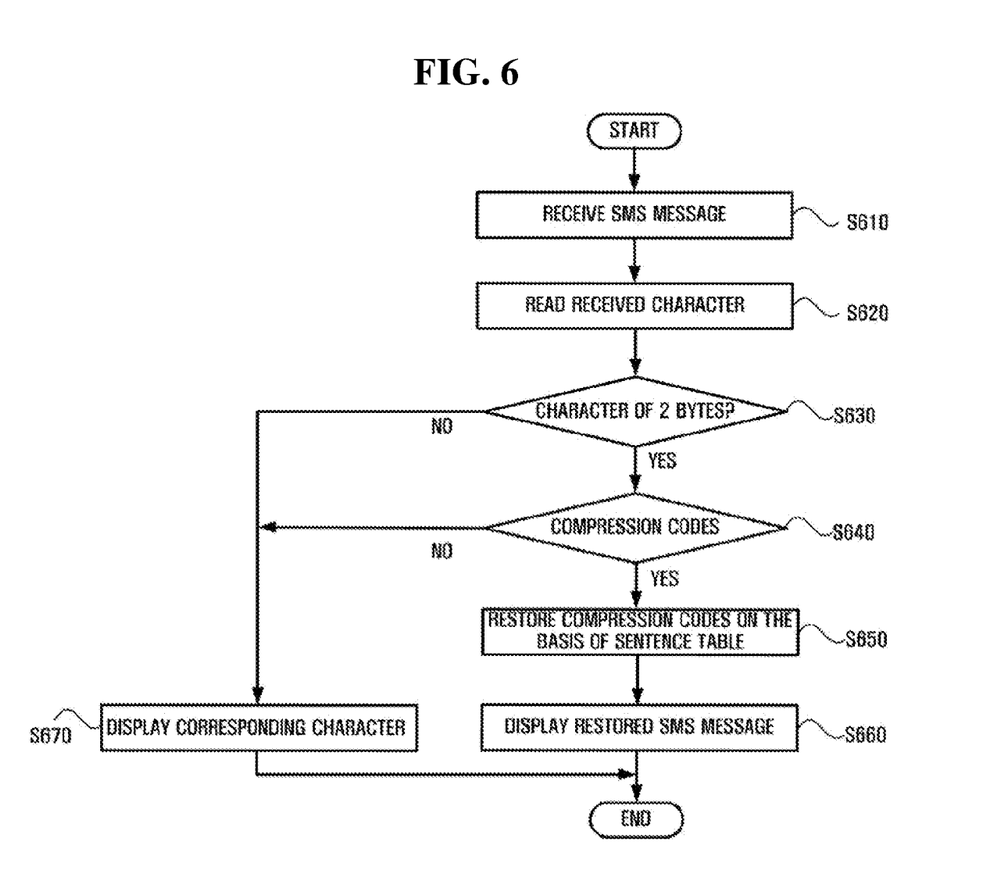
FIG. 6 is a flowchart illustrating a process of restoring an SMS message in a method of compressing and restoring an SMS message according to an exemplary embodiment of the invention.

FIG. 6 is a flowchart illustrating a process of restoring an SMS message in a method of compressing and restoring an SMS message according to an exemplary embodiment of the invention.

First, the transmitting/receiving unit 160 receives an SMS message (that is, transmission data) that is transmitted by another apparatus 100 (operation S610).

Then, the control unit 170 reads the received character (or sentence) and determines whether a size of the received character (or sentence) is one byte or two bytes (operations S620 and S630).

If it is determined that the size of the received character is two bytes (YES of operation S630), the control unit 170 determines whether the corresponding character (or sentence) is a compression code (operation S640). If it is determined that the corresponding character is a compression code (YES of operation S640), the converting unit 150 restores the corresponding compression code as the recommended sentence (or recommended character) on the basis of the sentence table 400 stored in the storage unit 140 (operation S650).

Then, the restored recommended sentence (or recommended character) is displayed on the display panel 200 of the apparatus 100 through the display unit (operation S660).

If it is determined in operation S630 that the size of the character (or sentence) is not two bytes (NO of operation S630), the control unit 170 can determine the corresponding character as an English language character. Further, since the character having the size of one byte is not the compressed character, the control unit 170 controls the display unit 120 to display the corresponding character on the display panel 200 (operation S670). Further, if the received character has a size of one byte, the control unit 170 reads the next character of one byte, and determines whether the corresponding character is simply a character of one byte or composed of one or more characters (the English language characters) of one byte.

When it is determined in operation S640 that the corresponding character (or sentence) is not the compression code (NO of operation S640), the control unit 170 allows the display unit 120 to display the corresponding character (or sentence) on the display panel 200 (operation S670).

According to the apparatus and method of compressing and restoring an SMS message according to the exemplary embodiment of the invention that has the above-described structure, the following effects may be achieved.

When the user creates an SMS message, the compressed characters are used, and thus, a large amount of information in the restricted capacity of characters can be transmitted.

Further, the compression process does not need to be additionally performed. The user selects the recommended sentence (or recommended character) while confirming the compressed capacity, and thus, the user can input the SMS message at the same time as the compression. Accordingly, the user can easily input the characters or sentences.

Furthermore, the sentences (or characters) are compressed by using the sentence table, and the character codes are compatible with the character codes used in the existing SMS service.

Furthermore, the recommended sentence searching function is provided, and thus the user can easily input the sentences or the characters, thereby enabling the user to accurately input the sentences or the characters.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for compressing a Short Message Service (SMS) message, the apparatus comprising:
    an input unit through which characters are input by a user;
    a display unit which displays the characters input by the user;
    a control unit which compares the characters input by the user with a stored sentence table of recommended sentences to determine whether there is at least one recommended sentence among the recommended sentences of the sentence table that includes the input characters, and if it is determined that there is the at least one recommended sentence that includes the input characters, controls the display unit to display the at least one recommended sentences;
    a converting unit which converts a recommended sentence selected by the user from among the at least one recommended sentence displayed by the displayed unit into a compression code; and
    a transmission unit which transmits an SMS message that includes the recommended sentence converted into the compression code,
    wherein a size of the compression code for the recommended sentence selected by the user is a predetermined fixed size regardless of the number of words in the at least one recommended sentence,
    wherein the predetermined fixed size is used to determine whether a character or a sentence in the SMS message is a compression code.

2. The apparatus of claim 1, wherein the at least one recommended sentence is provided in a recommended sentence window displayed by the display unit.

3. The apparatus of claim 1, wherein the predetermined fixed size is two bytes.

4. The apparatus of claim 1, wherein the sentence table is configured such that extra sequence codes and the recommended sentences, which are aligned in ascending power, are matched with each other on a one-to-one basis.

5. The apparatus of claim 1, wherein the recommended sentence is selected by the user through the input unit,
    the apparatus further comprising:
    a storage unit which stores the sentence table; and
    a transmission data managing unit which manages transmission data of the SMS message including the recommended sentence converted into the compression code.

6. The apparatus of claim 1, wherein if the characters input by the user are part of a general sentence, a same character code which is input by the user is included in the SMS message.

7. The apparatus of claim 1, wherein the control unit determines the used capacity of the SMS message by adding a used capacity of the recommended sentences selected by the user with a used capacity of general sentences input by the user into the SMS,
    wherein the used capacity of each of the recommended sentences selected by the user is two bytes, and
    wherein the used capacity of the general sentences input by the user into the SMS corresponds to the number of characters in the general sentences input by the user into the SMS.

8. The apparatus of claim 1, wherein the at least one recommended sentence comprises a plurality of words.

9. The apparatus of claim 1, wherein the control unit compares the characters input by the user with the stored sentence table of recommended sentences by performing a binary search of the stored sentence table using the characters input by the user.

10. A method of compressing a Short Message Service (SMS) message, the method comprising:
    comparing characters input by a user with a stored sentence table of recommended sentences and determining whether there is at least one recommended sentence among the recommended sentences of the sentence table that includes the input characters based on a result of the comparing;
    if it is determined that there is the at least one recommended sentence that includes the input characters, displaying the at least one recommended sentence;

displaying a recommended sentence selected from among the at least one recommended sentence that is displayed;

converting the displayed recommended sentence that is selected into a compression code; and transmitting an SMS message that includes the recommended sentence converted into the compression code, wherein a size of the compression code for the displayed recommended sentence is a predetermined fixed size regardless of the number of words in the at least one recommended sentence, wherein the predetermined fixed size is used to determine whether a character or a sentence in the SMS message is a compression code.

11. The method of claim 10, wherein the at least one recommended sentence is displayed in a recommended sentence window.

12. The method of claim 10, wherein each of the predetermined fixed size is two bytes.

13. The method of claim 10, wherein the sentence table is configured such that extra sequence codes and the recommended sentences, which are aligned in ascending power, are matched with each other on a one-to-one basis.

14. The method of claim 10, wherein, if it is determined that there is not at least one recommended sentence among the recommended sentences of the sentence table, the input characters are displayed.

15. The method of claim 10, further comprising:

if it is determined there is not at least one recommended sentence that corresponds to the input characters, determining the characters input by the user are part of a general sentence and including a same character code which is input by the user is input into the SMS message.

16. The method of claim 10, further comprising:

determining the used capacity of the SMS message by adding a used capacity of recommended sentences selected by the user with a used capacity of general sentences input by the user into the SMS message, wherein the used capacity of each of the recommended sentences selected by the user is two bytes regardless of the size of the sentence recommended sentence, and wherein the used capacity of the general sentences input by the user into the SMS message corresponds to the number of characters in the general sentences input by the user into the SMS message.

17. The method of claim 10, wherein the displayed at least one recommended sentence comprises a plurality of words.

18. The method of claim 10, wherein the comparing the characters input by the user with the stored sentence table of recommended sentences comprises performing a binary search of the stored sentence table using the characters input by the user.

* * * * *